United States Patent [19]

Ishima

[11] 4,350,221
[45] Sep. 21, 1982

[54] SNOWMOBILE FRAME WITH CORNER-MOUNTED DAMPERS

[75] Inventor: Takaharu Ishima, Iwata, Japan

[73] Assignee: Yamaha Hatsudoki Kabushiki Kaisha, Iwata, Japan

[21] Appl. No.: 160,469

[22] Filed: Jun. 18, 1980

[30] Foreign Application Priority Data

Jun. 30, 1979 [JP] Japan .................................. 54/83141

[51] Int. Cl.³ .................... B60N 3/00; B60R 19/08
[52] U.S. Cl. .................... 180/190; 293/126; 293/142; 296/187
[58] Field of Search .................... 180/190; 293/142; 243/126; 296/187

[56] References Cited

U.S. PATENT DOCUMENTS

| | | | |
|---|---|---|---|
| 3,574,406 | 4/1971 | Wessells | 293/142 |
| 3,588,142 | 6/1971 | Gorman | 293/109 X |
| 3,613,812 | 10/1971 | Hetteen | 180/190 X |
| 3,785,688 | 1/1974 | Sibley | 293/126 X |
| 3,877,536 | 4/1975 | Earhart | 180/190 |
| 3,897,839 | 8/1975 | Brisebois | 180/190 |
| 3,901,335 | 8/1975 | Johnson | 180/190 |
| 3,930,689 | 1/1976 | Maki | 180/190 X |
| 4,057,916 | 11/1977 | Roemer | 180/190 X |
| 4,116,496 | 9/1978 | Scott | 180/190 X |
| 4,213,513 | 7/1980 | Beck | 180/190 X |

FOREIGN PATENT DOCUMENTS 2702269  8/1977  Fed. Rep. of Germany ...... 293/126

*Primary Examiner*—Joseph Paul Brust
*Attorney, Agent, or Firm*—Donald D. Mon

[57] ABSTRACT

A small snowmobile frame has an upper plate which is pressed down from two side edges to form respective side plates and laterally projecting foot plates. These plates terminate at the rear end of the frame. Dampers made of elastic material include a recess to receive the rear end of at least the respective foot plate and cover the rear ends of the side and foot plates. They can be held to the frame by screws.

6 Claims, 6 Drawing Figures

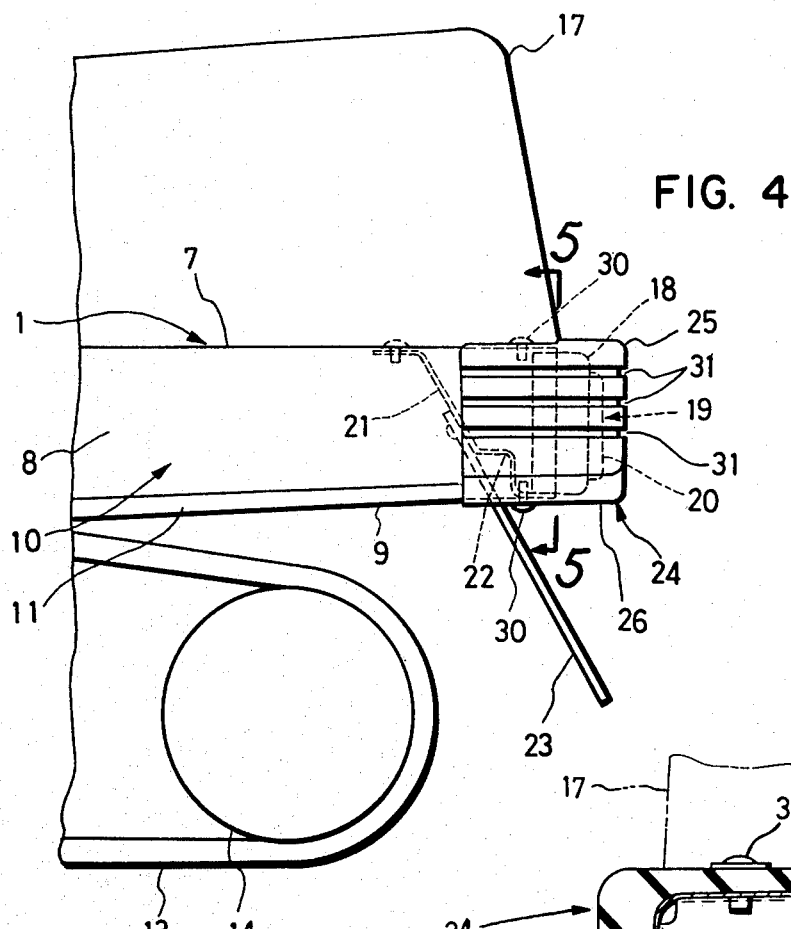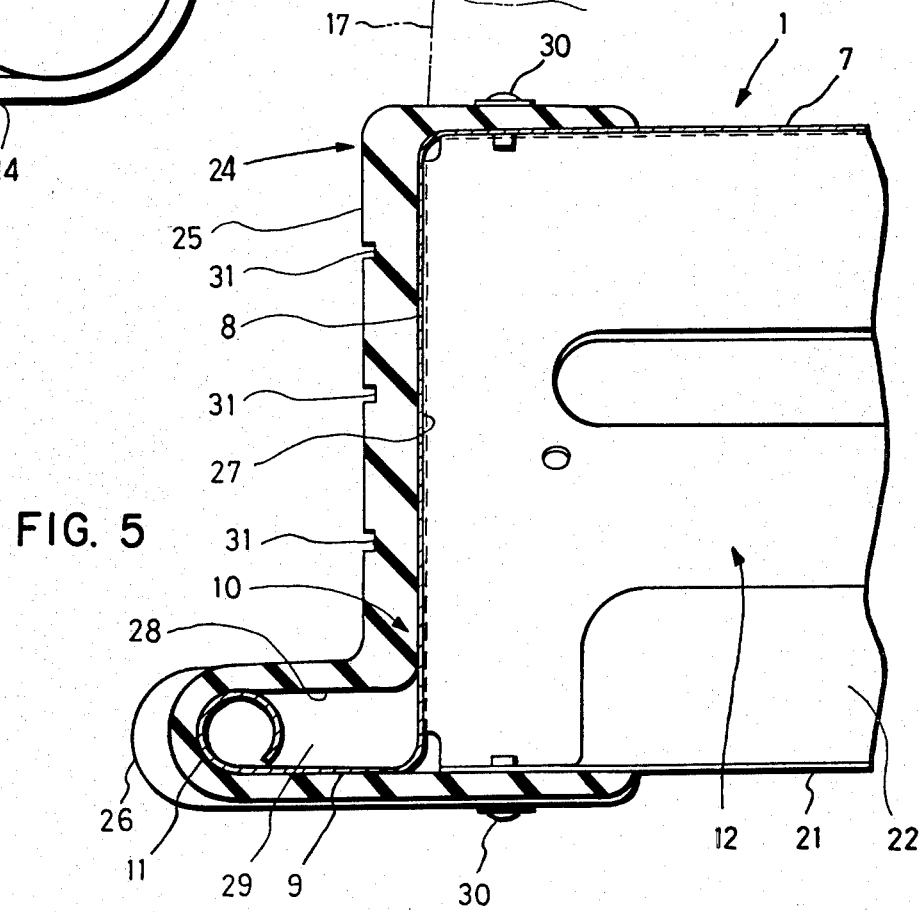

SNOWMOBILE FRAME WITH CORNER-MOUNTED DAMPERS

FIELD OF THE INVENTION

This invention relates to small-sized snowmobiles, and in particular to damper means for outside corners of their frames.

BACKGROUND OF THE INVENTION

Generally speaking, a small-sized snowmobile is constructed with an engine mounted in the front portion of the frame of the chassis and a seat attached to the upper side of the rear portion of the frame. The frame is customarily press-molded of a steel or aluminum plate with steps integrally formed that comprise side plates extending downward and foot plates projecting outwardly sidewise of the chassis from the lower ends of the side plates while also extending in the longitudinal direction. If the rear ends of these steps are to be left free and unsupported, the shaping of the rear end edges becomes difficult, and the strength of the steps is insufficient. According to the prior art, therefore, triangular reinforcement plates are attached to the rear end edges of the side plates and the foot plates of the steps to reinforce the rear end portions of the steps. However, although this prior art technique can provide reinforcement for the rear end portions of the steps, the angular portions still remain at the rear end portion of the steps, and thus the shaping remains difficult.

It is an object of this invention to provide means to reinforce the steps at their rear ends, while facilitating the shaping of the steps themselves.

BRIEF DESCRIPTION OF THE INVENTION

This invention is carried out in a small-sized snowmobile frame which includes an upper plate that is pressed down from two side edges to form respective side plates and laterally projecting foot plates. These plates terminate at the rear of the frame. Dampers made of elastic material include a recess to receive the rear end of at least the respective foot plate and cover the rear ends of the respective side and foot plates. They can be held to the frame by screws or other suitable fastener means.

According to a preferred but optional feature of the invention, the rear end of each foot plate is curled to form a bead, and the recess matches the bead and slidingly receives it.

The above and other features of this invention will be fully understood from the following detailed description and the accompanying drawings, in which:

BRIEF DESCRIPTION OF THE DRAWINGS

FIG. 4 is a side elevation of a portion of FIG. 1;

FIG. 5 is a sectional view taken along line V—V in FIG. 4; and

DETAILED DESCRIPTION OF THE DRAWINGS

Figure 1:
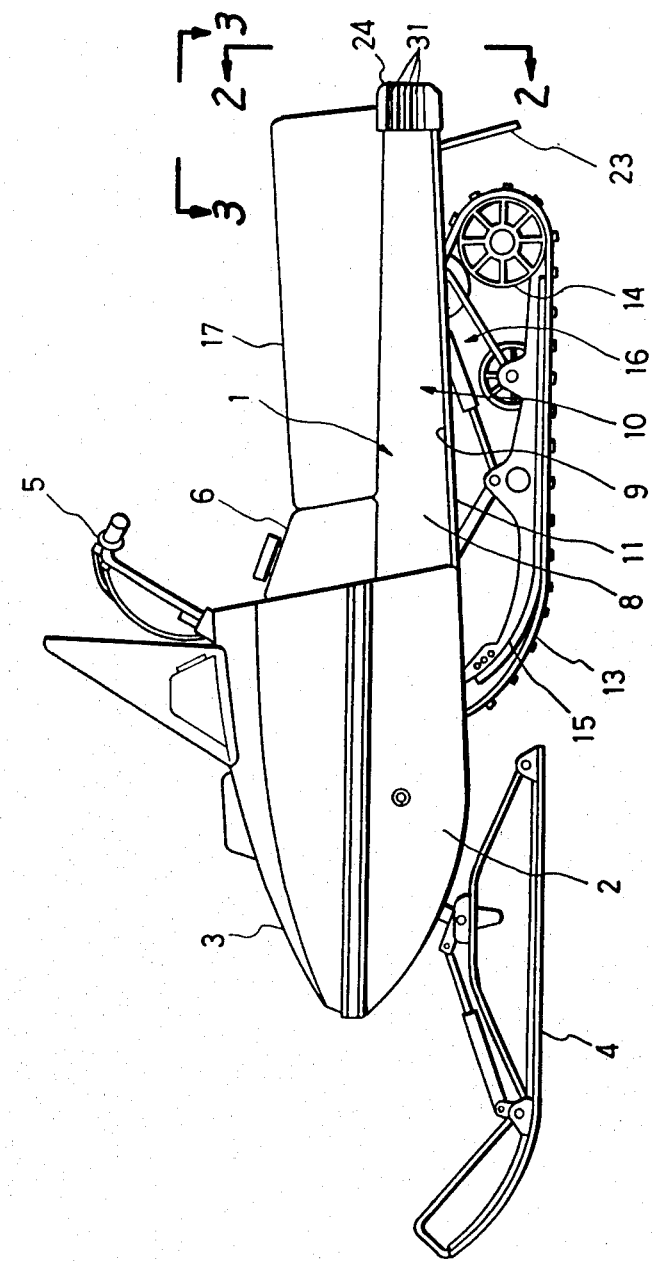
FIG. 1 is a side elevation of a snowmobile incorporating the invention.
Figure 2:
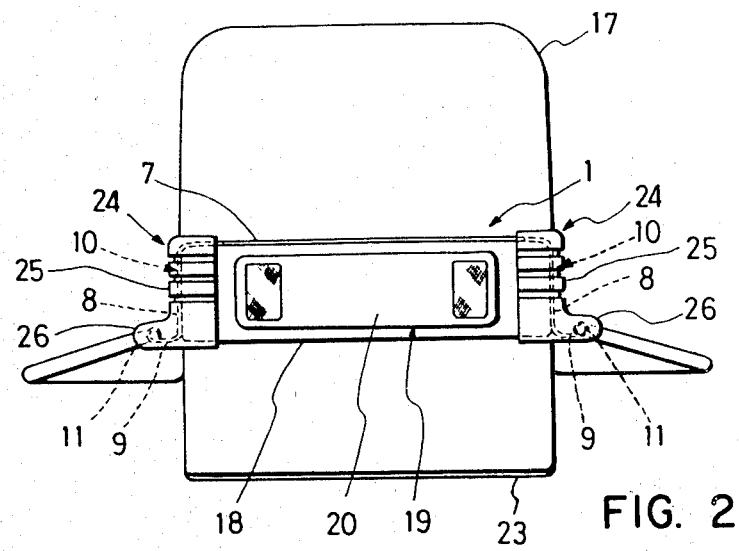
FIG. 2 is an elevation viewed along line II—II in FIG. 1.
Figure 3:
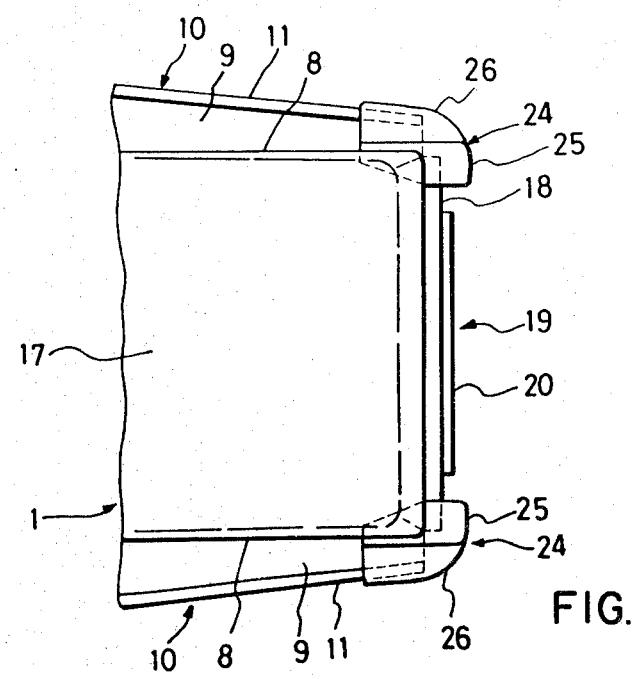
FIG. 3 is an elevation viewed along line III—III in FIG. 1.
Figure 6:
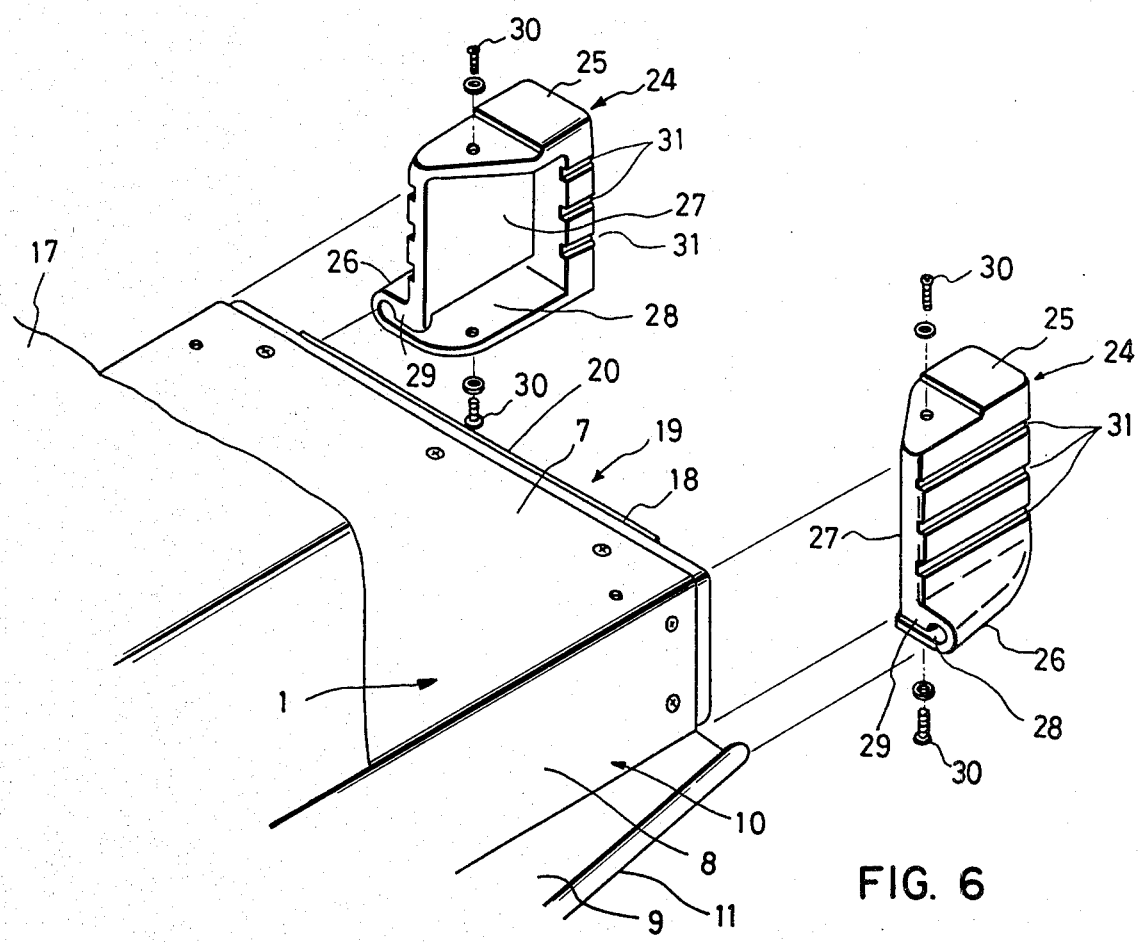
FIG. 6 is an exploded perspective view of the rear portion of the frame in FIG. 1.

A frame 1 has a front portion for mounting an engine (not shown) thereon. It is covered by a bottom cover 2 and a shroud 3. A ski 4, a handle 5 and a fuel tank 6 are carried by the frame. Frame 1 is press-molded from a steel plate, and when formed comprises an upper plate 7, a pair of side plates 8 protruding downward from both sides of upper plate 7, and a pair of foot plates 9 protruding laterally sidewise from the frame at the lower ends of side plates 8. Side plates 8 and foot plates 9 are formed integral with the upper plate. They constitute steps 10. Steps 10 extend substantially the whole length of the frame until they reach the rear end of the frame. Foot plates 9 are made narrower as they extend in the backward direction and are curled at their side edges to form curled portions 11. The side plates and foot plates at each side are mirror images of one another. Frame 1 has its lower portion formed into a track house 12, in which a track 13 is mounted. A guide wheel 14, a slide rail 15 and a suspension mechanism 16 are provided in the track house. A seat 17 is attached to the upper side of the frame 1. A bumper 18 is attached to the rear end portion of track house 12 of frame 1. Bumper 18, thus attached, is press-molded of a steel plate into a box shape, in which a tail lamp 19 is mounted. Tail lamp 19 has a lens 20 protruding from the rear side of the bumper 18. A reinforcing plate 21 is disposed at an inclination in front of the bumper 18 within the track house 12 of the frame 1 and its upper edge portion is attached to the lower side of upper plate 7 of frame 1, its side edge portion attached to the inner sides of side plates 8 and its lower edge portion attached to the lower side of bumper 18, thus reinforcing the rear end portion of frame 1 and bumper 18.

A handle 22, which is recessed stepwise, is made integral with the lower portion of reinforcing plate 21. A flap 23, made of an elastic material such as a synthetic resin, is attached at its upper edge portion to the front center portion of reinforcing plate 21. Flap 23, thus attached, protrudes obliquely downwardly along the reinforcing plate 21 thereby to prevent snow, which is raised by the track 13, from splashing.

Dampers 24 are attached to the both sides of the rear end portion of frame 1. Those dampers 24 are made integral from an elastic material such as a synthetic rubber material, and are composed of a body portion 25 having a generally rectangular shape and a bulging portion 26 protruding from the lower ends of body 25 outwardly to the outsides of the chassis. The damper members are mirror images of one another, and otherwise identical. Therefore only one will be described in full detail. Body portion 25 has a recess 27 with its inner and front side open. Recess 27 is fitted onto the rear end portion of the outer side of the respective side plate 8 one at each edge of the rear side of bumper 18, on the rear end portion of the upper side of the frame 1, and on the end portion of the lower edge of the reinforcing plate 21 which is mounted in the track house 12, so that the side plates 8 of the steps 10 are covered at their rear end edges with the body portions 25.

On the other hand, the bulging portion 26 is formed with a fitting groove 28 which is opened at its front side and in the recess 27 of body portion 25. Fitting groove 28 thus opened, is fitted onto the rear end portion of the respective foot plates 9 so that the foot plates 9 are covered at their rear end edges with a bulging portion 26 of the respective damper member. The fitting grooves 29 are made to have dimensions corresponding to the outside diameter of curled portion 11 of foot plates 9, and formed at the front opening thereof with protrusion 29, by which the front opening is formed into a shape corresponding to the cross-sectional shape of foot plates 9. The front opening is so snugly fitted on the foot plates 9 that no snow may steal into fitting groove 28. The dampers 24 are fitted forwardly upon the rear end portions of the frame 1 and the steps 10, and are attached to the frame by means of fitting screws 30 which are fastened through the upper and lower sides of dampers 24 to upper plate 7 of frame 1 and to the lower edge portion of reinforcing plate 21. Here, body portions 25 of dampers 24 have their upper sides lowered at their front halves and sandwiched between upper plate 7 of frame 1 and seat 17. For this construction, the bottom of the seat 17 is cut away at the portion corresponding to the front half of the upper side. The rear end faces of body portions 25 of dampers 24 are made to protrude backward from the lens 20 of tail lamp 19, thereby to protect the lens 20. Body portions 25 have a plurality of grooves 31 formed in it which extend horizontally.

According to the embodiment of the present invention thus far described, since the rear end edges of the side plates and the foot plates are covered with the dampers 24, which are made of an elastic material, a person can be protected from those edges and being injured by them, thus improving the safety of the snowmobile. Also, because dampers 24 are integrally attached and are fitted upon the rear end portions of the side plates and the foot plates the rear end portions of the steps 10 are reinforced by the dampers, thereby to simplify the construction by not requiring any additional reinforcing member. Furthermore, the attaching structure for dampers 24 is greatly simplified, merely using fastening screws 30 or other simple fastener devices.

The present invention is not to be limited to the embodiment thus far described. For example, the shape of the dampers is not necessarily limited to that already described, but can be such that the dampers are fitted on to cover both the rear end portions of the side and foot plates of the steps.

Moreover, the detailed constructon of the frame and steps should not necessarily be limited to that already described. As has been described hereinbefore, according to the present invention, a small-sized snowmobile is characterized in that the chassis has its frame formed at its both sides with steps which are composed of side plates protruding downward and foot plates protruding sidewise from the chassis from the lower ends of said side plates, and which extend longitudinally of the chassis, and that damper members, which are made of an elastic material are fitted on at least the rear ends of the foot plates of said steps thereby to cover the same. They are attached to the rear ends of said steps. As a result, the rear end edges of the side and foot plates of the steps are covered with the dampers so that a person can be protected from colliding against and being injured by those rear end edges, thereby enhancing the safety of the snowmobile. Moreover, the dampers are integrally attached while being fitted on the rear end portions. Also, because the rear end portions of the steps are reinforced by the dampers, it is unnecessary to provide any additional reinforcing member, thus simplifying the construction. Since the dampers are fitted on the rear end portions of the steps, they can be attached by simple fastener means, thus, considerably simplifying the attachment of the dampers to the frame.

This invention is not to be limited to the embodiments shown in the drawings and described in the description, which are given by way of example and not of limitation, but only in accordance with the scope of the appended claims.

I claim:

1. In a frame for the chassis of a small snowmobile, comprising an upper plate having a pair of opposite side edges, said side edges being pressed downwardly to form respective side plates, and pressed laterally to form respective foot plates at and integrally with the lower edge of the respective side plates, said side plates and foot plates extending along said side edges and terminating at the rear end thereof to form a corner, each said foot plate being substantially flat and horizontal for a substantial area adjacent to said plate at said rear end, the improvement comprising: a damper member made of elastic material disposed at each side of said frame, each said damper being fitted over and covering the top and bottom of at least the rear end portion of said foot plate, extending upwardly along said side plate, and atop said upper plate; and attachment means attaching said damper to said upper plate inwardly of said side plates whereby said damper provides structural support for said rear end of said foot plate to resist downward bending.

2. Apparatus according to claim 1 in which each said foot plate includes an enlarged outer edge, and in which each said damper has a slot adapted to slide onto and receive said enlarged outer edge.

3. Apparatus according to claim 2 in which each said damper member includes a recessed portion to receive and abut against the outer surface of its respective side plate adjacent to the rear end thereof.

4. Apparatus according to claim 1 in which said attachment means is a screw.

5. Apparatus according to claim 1 in which said damper includes an underlying and overlying portion relative to said foot plate, at least said underlying portion abutting the bottoms of said rear end portion of said foot plate, said underlying and overlying portions being connected to one another whereby to provide structure for providing said support.

6. Apparatus according to claim 5 in which said underlying and underlying portions, and the portion abutting the side plate are all integral with a portion that closes the rear end portion of said bumper.

* * * * *